(12) United States Patent
Flynn et al.

(10) Patent No.: US 10,078,306 B2
(45) Date of Patent: Sep. 18, 2018

(54) SECURITY HOLOGRAMS FORMED USING LENTICULAR MULTICHANNEL IMAGE GENERATION DEVICE

(71) Applicants: Patrick Flynn, Halstead (GB); John David Wiltshire, Coggshall (GB); Jonathan Henry Wiltshire, Colchester (GB)

(72) Inventors: Patrick Flynn, Halstead (GB); John David Wiltshire, Coggshall (GB); Jonathan Henry Wiltshire, Colchester (GB)

(73) Assignee: M R STEPHENSON GROUP LIMITED (GB)

( * ) Notice: Subject to any disclaimer, the term of this patent is extended or adjusted under 35 U.S.C. 154(b) by 465 days.

(21) Appl. No.: 13/939,772

(22) Filed: Jul. 11, 2013

(65) Prior Publication Data
US 2013/0301090 A1    Nov. 14, 2013

Related U.S. Application Data

(63) Continuation-in-part of application No. 12/599,403, filed as application No. PCT/GB2008/050334 on May 7, 2008, now Pat. No. 8,503,052.

(51) Int. Cl.
*G03H 1/00*    (2006.01)
*G03H 1/20*    (2006.01)
(Continued)

(52) U.S. Cl.
CPC .............. *G03H 1/20* (2013.01); *G03H 1/0011* (2013.01); *G03H 1/202* (2013.01); *G03H 1/041* (2013.01); *G03H 1/268* (2013.01); *G03H 2001/0415* (2013.01); *G03H 2001/0417* (2013.01); *G03H 2001/184* (2013.01); *G03H 2001/2615* (2013.01); *G03H 2210/22* (2013.01);
(Continued)

(58) Field of Classification Search
None
See application file for complete search history.

(56) References Cited

U.S. PATENT DOCUMENTS 6,309,735 B1    10/2001    Ueda et al.
6,822,769 B1    11/2004    Drinkwater et al.
(Continued)

FOREIGN PATENT DOCUMENTS

EP              0 283 233 A    9/1988
WO        WO 92/09444 A    6/1992
WO      WO 2005/034019 A    4/2005

*Primary Examiner* — Stephone B Allen
*Assistant Examiner* — Ryan S Dunning
(74) *Attorney, Agent, or Firm* — Tarolli, Sundheim, Covell & Tummino LLP

(57) ABSTRACT

We describe methods of mass-producing full color, 3D holograms, potentially incorporating a personalized image, which are particularly suitable for security purposes. Broadly speaking in embodiments a method generates, electronically, an interlaced image comprising a set of different views of a 3D object from different angles. This is projected onto a diffusing screen using coherent light and mapped from the screen into an angularly encoded object beam using a lenticular array. The different views in the angularly encoded object beam are then recorded simultaneously into holographic film using a reference beam.

14 Claims, 8 Drawing Sheets

(51) Int. Cl.
G03H 1/26 (2006.01)
G03H 1/04 (2006.01)
G03H 1/18 (2006.01)

(52) U.S. Cl.
CPC ..... *G03H 2210/52* (2013.01); *G03H 2210/54* (2013.01); *G03H 2210/55* (2013.01); *G03H 2210/562* (2013.01); *G03H 2222/18* (2013.01); *G03H 2223/19* (2013.01)

(56) References Cited

U.S. PATENT DOCUMENTS

| | | | |
|---|---|---|---|
| 7,154,647 B1 | 12/2006 | Takabayashi et al. | |
| 7,961,367 B2 | 6/2011 | Ha | |
| 2001/0053004 A1* | 12/2001 | Nishikawa | G02B 5/0252 359/15 |
| 2002/0163678 A1* | 11/2002 | Haines | G03H 1/0011 359/2 |
| 2006/0072178 A1* | 4/2006 | Takabayashi | G03H 1/2249 359/24 |
| 2007/0097472 A1* | 5/2007 | Ha | G03H 1/26 359/35 |
| 2007/0206248 A1 | 9/2007 | Winterbottom et al. | |
| 2010/0027082 A1 | 2/2010 | Wiltshire | |

\* cited by examiner

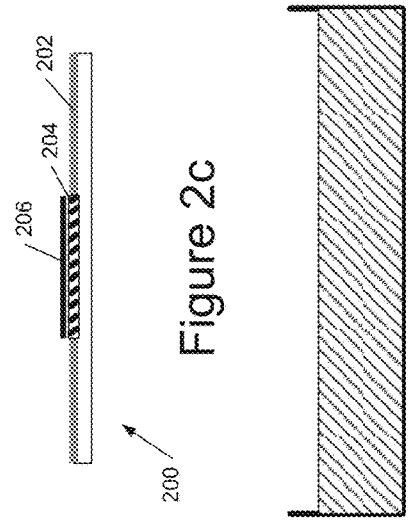
Figure 2a
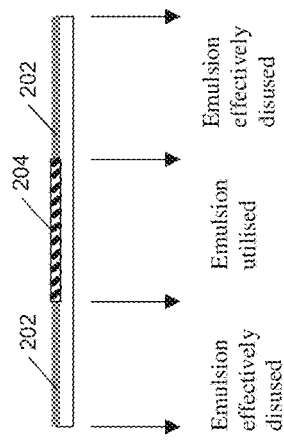
Figure 2b
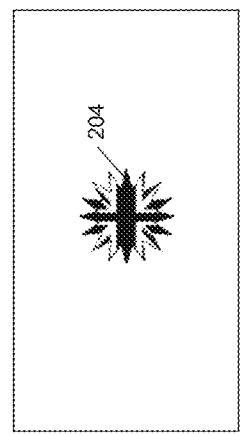
Figure 2c
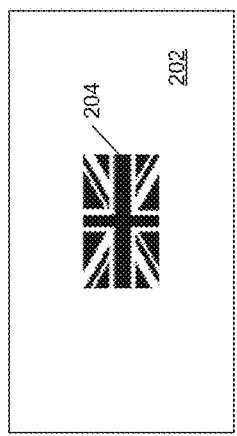
Figure 2d
Figure 2e
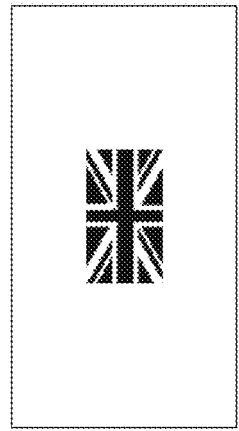
Figure 2f

SECURITY HOLOGRAMS FORMED USING LENTICULAR MULTICHANNEL IMAGE GENERATION DEVICE

RELATED APPLICATION

This application is a continuation-in-part of U.S. patent application Ser. No. 12/599,403 filed on 22 Apr. 2010, the entirety of which is incorporated herein by reference.

FIELD OF THE INVENTION

This invention relates to methods and apparatus for recording a holographic image onto holographic recording film, and to film bearing recorded holographic images. The techniques we describe are particularly useful for rapid mass-production of security holograms including personalised or individualised holograms where each individual unit contains unique optical data.

BACKGROUND TO THE INVENTION

Volume reflection holograms have been mass-produced in the past, predominantly in monochromatic form, by companies such as Applied Holographics plc, Third Dimension Ltd., and Du Pont Authentication Systems inc., by a process of contact copying of image-planed master holograms. These master holograms have generally been created by one of two alternative techniques.

One technique involves the production of second-generation (H2) contact masters from redundant first generation (H1) recordings where the recording of subject matter distant to the recording plate enables multiple channels of image information to be recorded in the H1 such that image-switching effects occur when the second generation hologram is viewed by a viewer's eye, effectively through the window of the virtual H1. This technique is commonly used in holography and is similar to the method used to create classical embossed hologram masters. It is referred to as 'conventional H1/H2 mastering', or 'split beam holography' and follows the published work by Upatnieks and Leith in the 1960's.

A second technique allows for the initial recording of a first generation master hologram especially in a medium such as dichromated gelatine (DCG), whose grainless clarity, low absorption, and high maximum diffraction efficiency capability enable the preparation of a near-field recording with exceptional brightness and a very wide window of view. This type of hologram where a hologram recording of an image from an object or a master hologram is made with the use of only one expanded laser beam, such that the single beam acts both as the reference beam for the hologram and also gives rise to the object beam when reflected back from an object or hologram, is called a 'Denisyuk' or 'single-beam' hologram. Recent developments in the production of certain pancromatic ultra-fine grain silver halide materials (such as HRT BBPan from Colour Holographic, London) and modern photopolymer film (such as Bayfol HX from Bayer Materials Science, Chempark, Leverkusen, Germany) mean that these materials can rival the performance of DCG.

The first of these techniques leads to bright multi-channel images which have been criticised by some observers for their limited viewing angle, equivalent to a window of the same size as the H1 master, spaced some distance from the final hologram.

The latter method, however, provides a very wide viewing angle since a master, typically of the same size, may be placed in this case very close to the subject matter. Thus the viewing window of this system may be equivalent to almost a complete hemisphere. However this type of master does not possess the capability to provide animation, or image switching, and because light is diffracted into such a wide viewing zone by this technique the image brightness as perceived from any particular viewing position will tend to be less than with the former method of mastering.

It is nonetheless desirable to be able to record multiple different holographic images in a single recording medium, especially for security applications. It is also desirable to be able to record images onto flexible film rather than rigid glass plates for many reasons including cost and ease of mass production. However the flexible nature of film provides some special challenges which can make recording of holographic images, especially multiple images for security purposes, difficult in practice.

One specific problem associated with recording holograms into film as compared with a glass substrate arises because typically the film must be held substantially motionless (say to better than a quarter wavelength) for a relatively long period whilst the hologram is recorded. This is difficult because film is not rigid. We have designed exposure equipment which uses suitable means for silver halide film and for photopolymer film to enable the recoding medium to remain substantially stationary during the laser recording process. A further problem arises because the hologram emulsion tends to appear cloudy, especially when illuminated with light towards the blue end of the spectrum, and this can also make the recording of multiple different holographic images into a single film hologram difficult. The newly developed recording materials mentioned previously have reduced levels of scatter and absorption which reduce the level of difficulty in achieving high diffraction efficiency in the film hologram copies.

The use of reflection volume holograms for individualised identity purposes has been demonstrated by Bundesdrückerei (Berlin, Germany) in the German passport but the essentially monochromatic 2D (planar) image does not demonstrate the full capabilities of the hologram technology. The principle reason for this is that the representation of 3D full colour images is extremely difficult to achieve in "real time"—that is a timescale compatible with the continuous conventional printing of ID documents such as ID cards or passports.

The recording of a sequence of stereographic images of a human facial portrait can be achieved using a range of displaced camera lenses or by employing a moving camera upon a track (dolly rail). We have previously described a technique employing this approach but involving an intermediate mastering stage (our U.S. Ser. No. 13/876,269). However the intermediate mastering stage is complex and time consuming, in particular since chemical processing is also involved. The method of Yano et al U.S. Pat. No. 4,067,638 dates from 1978. is complex and requires special viewing aids.

The "one-step" method of Haines for embossed holography at Simian Technologies Inc in 1988 was the first system to achieve commercial production of high-quality images through a one-step process. This system was built for Simian Technologies, a company Haines started with his daughter, Debby Haines, a computer programmer who developed the software to process the data from the computer to the LCD, and to automate the system. Simian's precision system created small, full-colour rainbow holograms from 3D animation or video data on a photoresist plate. The end results were holograms for large-run, mass production via a casting/ embossing process, but the system requires sensitive, complex software control and is designed to produce transmission hologram linear fringe structures. The process is also relatively time consuming in getting the image data into holographic form, and its throughput speed is incompatible with the present commercial requirements.

We describe techniques which overcome these and other difficulties.

SUMMARY OF THE INVENTION

Thus the invention provides a method of recording a holographic image onto holographic recording film, said holographic image comprising a hologram of a three-dimensional (3D) object from a lenticular multi-channel image generation device, the method comprising: forming a holographic recording stack by: positioning said holographic recording film over said lenticular multichannel image generation device; generating said three-dimensional (3D) object using said lenticular multichannel image generation device; and recording said holographic image in said holographic recording film, forming a volume hologram by illuminating said stack through said holographic recording film with a laser light of at least one wavelength.

Such techniques facilitate the mass-production of full colour, 3D holograms, potentially incorporating a personalised image, which are particularly suitable for security purposes. Broadly speaking embodiments of the method can form a full colour 3D hologram in a single exposure step (albeit the different colours may be exposed sequentially), effectively replacing a chemistry-based step of creating an intermediate master with an electronic image processing step. Thus in embodiments the method generates, electronically, an interlaced image comprising a set of different views of a 3D object from different angles. This is projected onto a diffusing screen using coherent light and mapped from the screen into an angularly encoded object beam using a lenticular array. The different views in the angularly encoded object beam are then recorded simultaneously into holographic film using a reference beam.

Thus preferred embodiments of the method locate an optical diffuser beneath the lenticular multichannel image generation device and illuminate this with a coherent object beam. A spatial light modulator such as an LCD (liquid crystal display), LCOS (liquid crystal on silicon) device, or DMD (digital micromirror device) is positioned beneath the lenticular multichannel image generation device (more generally, in an optical path between a coherent light source and the optical diffuser). This is used to generate from the screen in combination with the lenticular, in effect, a three-dimensional object, more precisely an object beam which encodes a 3D object viewed from different angles.

Thus embodiments of the method generate a spatially multiplexed image containing stereographic depth or animation for the spatial light modulator or digital micromirror device to encode into the coherent object beam. This is then converted to multiple different angles of the coherent object beam bearing different views of the multiplexed image using the lenticular multichannel image generation device.

In embodiments the holographic recording film is located adjacent the lenticular multi-channel image generation device in the stack. The "film" (which here includes a holographic emulsion on a glass plate) may be supported on a substrate. In some arrangements the film emulsion is towards the lenticular (so that it is eventually protected by the base layer). Alternatively the emulsion may be on the side of the film away from the lenticular, for example in an application such as a laminated plastic card where it is intended that the final holographic image should be viewed from the emulsion side, and thus in some cases it is preferable for the interlaced image, more particularly the set of interlaced views, to be a pseudoscopic image/set of views.

Where the lenticular comprises a set of cylindrical lenses (i.e. 1D lenses, in general not required to have a part-circular cross-section) an image under the lenticular comprises a set of interlaced stripes, such that light at different angles from the lenticular provides different parts of the image, the stripes belonging to different views of the object. Then the different views of the object may contain stereographic depth to generate a result giving the appearance of a three-dimensional object when the interfering light is recorded in the hologram. Preferably the (object and reference) laser light comprises red, green and blue laser light, and thus the holographic image may be a full colour holographic image.

In some preferred applications a method as described above is used for mass-producing a 3D colour volume hologram. Such a mass production method may comprise repeatedly stepping the film over the lenticular device forming the 3D and/or animated object, recording a hologram in the film at each step.

In a related aspect the invention provides a method of recording a hologram encoding a view of one or more objects, the method comprising: generating, electronically, an interlaced image comprising an interlaced set of a plurality of different views of said one or more objects; projecting said interlaced image onto a screen using coherent light; mapping said different views of said one or more objects in said interlaced image into an angular encoding of said object beam using a lenticular array to generate an angularly encoded object beam in which different angles of said object beam correspond to different said views of said one or more objects; and recording different views of said one or more objects simultaneously into holographic film by interfering said angularly encoded object beam with a reference beam to record said hologram.

In embodiments of the method the resulting hologram creates an effect which gives the impression of a hologram of a true 3D object although in fact what is being reproduced is a set of views of the object from different respective viewing angles, the lenticular screen encoding these simultaneously into an angularly encoded object beam. The hologram effectively records a set of images of the object each from a slightly different angle, the object beam encoding these different views, but the result appears to be the hologram of a 3D object rather than the hologram of a set of images—at least in embodiments where multiple fine gradations of different angles/corresponding view are employed. In a cruder system some jerkiness between viewing angles recorded in the hologram may be visible, to the extent that discrete switches of images from one to another may occur as the viewer moves the hologram or adjusts his/her position when viewing the film.

It will be appreciated that although some preferred implementations of the technique are employed to generate a 3D view of an object, other visual effects may additionally or alternatively be encoded: for example an object may be animated so that (optionally in 3D) it changes with viewing angle of the hologram. Other effects, for example appearing/disappearing objects may likewise be encoded. In practice, the security industry has a preference for "switching" effects which clearly differentiate holographic security devices from conventional printing techniques.

In a similar manner, although in embodiments a cylindrical array of lenses may be employed to provide horizontal parallax (a stereogram), additionally or alternatively vertical parallax may be provided, for example by using an array of 2D lenslets (i.e. a microlens array). In this way, for example, animation may be introduced with up-down tilt of the hologram.

In some preferred implementations the lenticular screen (and optionally also the diffuser) is formed from a holographic optical element (HOE). Typically a lenticular array has of order 30 to 150 lines per inch, but by employing an HOE much higher resolution, for example of order 500 lines per inch, may be achieved. There can be a significant level of unwanted zeroth order light from an HOE, but the effects of this can be reduced by illuminating the HOE at an acute angle (rather than perpendicularly), so that the zeroth order light misses the recording area (or at least the wanted portion of the recording area).

Unlike conventional techniques, embodiments of the approaches we describe enable a very simple, quick one-step recording process for generating, in embodiments, a full 3D, full colour hologram. Unlike conventional techniques, those we describe are particularly suited for mass production since it is straightforward to generate the interlaced images provided for the lenticular screen. In effect a step of a process which would otherwise be performed by chemical techniques, fabricating an intermediate hologram master, is performed electronically in generating the interlaced image, thus making the technique significantly quicker and cheaper than previous approaches. Furthermore since in embodiments there need only be a single exposure (optionally per colour) to generate the hologram, a mass production process may be employed in which an image is input, processed, flashed onto the emulsion simultaneously with a coherent reference beam to record the hologram, and the emulsion stepped onwards before the next hologram is recorded, providing the ability to record a separate 3D volume hologram in each step of the film/process. Thus it will be appreciated that embodiments of this technique facilitate the mass production of "personalised" or individualised holograms, for example a 3D facial portrait.

Embodiments of the technique may input 2D image data and generate data, electronically, 3D image data for generating different views of the object for recording the hologram. The skilled person will appreciate that there are existing 2D to 3D image conversion techniques which may be employed for this purpose.

When generating the interlaced image, the form of the interlaced image (1D or 2D) may be matched to the form of the lenticular screen. For example where an array of cylindrical lenses is employed 1D interlacing of a set of image stripes is used, but where 2D lenslets are employed then 2D interlacing of the image portions may be used. The skilled person will appreciate that the one or more objects encoded into the hologram may be of any type—captured from a real object (starting from either a 2D or a 3D image), or computer-generated, or of any other type. Preferably multiple laser beams of different respective wavelengths, for example red, green and blue wavelengths or a "white" combined laser, is/are used to generate a multi-colour or full-colour recording of an object in the hologram. The skilled person will appreciate that with multiple colour exposures these may be performed either sequentially, for example sharing a light modulator, or simultaneously, for example employing a separate light modulator for each colour plane and employing optics to combine the modulated colour planes onto the diffusing screen. Although simultaneous recording employs more optics, the overall recording process is faster.

In a further related aspect the invention provides apparatus for recording a hologram, the apparatus comprising: an image processing system to generate an interlaced image comprising an interlaced set of different views of one or more objects; a coherent light projection system to project a beam of coherent light bearing said interlaced image; a screen to convert said beam of coherent light to an intermediate image comprising said interlaced image; a lenticular array to encode said intermediate image into an angularly dispersed object beam in which different views within said interlaced image correspond to different angles within said angularly dispersed object beam; a coherent reference beam generation system to generate a coherent reference beam to interfere with said angularly dispersed object beam; and a holder to support a hologram recording medium in a region where said angularly dispersed object beam and said coherent reference beam interfere.

We also describe a method of recording a holographic image onto holographic recording film. The holographic image comprises a hologram of a three-dimensional (3D) object in conjunction with a multi-channel holographic image. The method comprises: forming a holographic recording stack by: positioning said holographic recording film over a multichannel image generation device; positioning at least one three-dimensional (3D) object or hologram of a 3D object (ie positioning a real 3D object or a or virtual holographic object) under said multichannel image generation device; and providing a transparent window in said multichannel image generation device in a region above said at least one object; and then recording said holographic image in said holographic recording film by illuminating said stack through said holographic recording film with a laser light of at least one wavelength.

In embodiments such a method enables the fabrication of a hologram of a three-dimensional object in combination with a multi-channel holographic image, in particular without the image of the 3D (real or virtual) object being obscured by the replay image from the multi-channel image generation device. Further by locating the 3D object under the multi-channel image generation device the multi-channel image generation device can support the holographic recording film whereas if the 3D object were uppermost in the stack (from the point of view of the illuminating or reference beam) it would be difficult to support the film in such a way that it did not drape over the object.

In some preferred embodiments the multi-channel image generation device comprises a multi-channel volume reflection hologram and thus the recording of the holographic image into the film comprises replaying the multi-channel image from this volume reflection hologram and recording the replayed image in the film. In embodiments the multi-channel volume reflection hologram is a second generation hologram (H2 or "H2 master") since this facilitates the provision of multiple channels; in certain embodiments therefore the hologram in the film may be a third generation (H3) hologram. In embodiments the H2 hologram may comprise multiple sets of alphanumeric characters or lettering or other images recorded through an H1 master with different, limited angles of view.

Preferably the multi-channel volume reflection hologram comprises a holographic plate and this could be holographic film laminated on a clear glass plate. Both configurations facilitate a high diffraction efficiency. This is important because in effect this H2 hologram provides the object beam for the recording film and, broadly speaking, the object and reference beams should be of similar brightness so that, broadly, the brightness of replay from the H2 hologram determines the brightness of the image recorded in the film. In some preferred embodiments one or more images replayed by a multi-channel volume reflection hologram are substantially planar. Thus embodiments of the method comprise locating a replay image of the multi-channel holographic image (from H2) by the film in a different plane to the hologram of the 3D object replayed by the film. Use of the multi-channel volume reflection hologram facilitates control of the plane of the replay image by this hologram, and hence by the H3 recording film, for example by around +/−5 mm or less. Choosing different planes for the 3D object and one or more replay images originating from a multi-channel volume reflection hologram helps to provide increased security.

In some preferred embodiments one or more of the images replayed by the film are substantially planar with respect to the surface of the film; preferably the replay field is substantially flat with collimated light; this facilitates locating replay images at different vertical distances within the replay field. In embodiments of the above-described method the images replayed by the film are approximately localised according to a 2D position on the surface of the film—that is, when viewed, they appear to have a 2D spatial position which corresponds with location on the surface of the film. Such a planar image zone located in the surface of the final film hologram will tend to have the advantage of reconstructing its image clearly (without blur) in lighting conditions which may be considered adverse for holography. Thus in some preferred embodiments an image generated by the multi-channel image generation device and the hologram of the 3D object are, when viewed, substantially spatially disjoint. In embodiments the replay of the 3D object by the film and the replay of one or more of the multi-channel images are substantially non-overlapping (at least from one viewing direction).

In embodiments of the method the 3D object has a limited height (depth in the z-plane), for example less than 6 mm, to facilitate a high quality recording and may, for increased security, have a surface relief pattern on an upper surface (towards the illuminating or reference beam). In embodiments the surface relief pattern provides edges which help to give the impression of a crisp replay image (again important for security).

The skilled person will understand that in embodiments of the above-described method the steps of forming the holographic recording stack may be performed in any order. The holographic recording film may comprise a recording medium such as (but not limited to) silver halide or photopolymer. In the case of silver halide preferably fine grain film, for example film of monodisperse grain diameter 15 nm, is employed to reduce blue scattering. Such film is available, for example, from Colour Holographic Ltd, London, UK, and with a slightly larger mean grain size, Harman Technologies, Mobberley UK. By providing a transparent window in the multi-channel image generation device above the object the replayed multi-channel holographic image may be substantially non-overlapping with the image of the 3D object and, more particularly, a clear replayed image of the 3D object may be formed (as previously mentioned without such a window the replayed image of the 3D object tends to be of a less bright appearance, lacking clarity). Where the multi-channel image generation device comprises a multi-channel volume reflection hologram such a transparent window may be provided by removing a portion of the hologram recording material in the region above the 3D object. Where the multi-channel image generation device comprises a lenticular image generation device (as discussed further below) such a window may be provided by omitting lenticular lenses from a portion of the device either to provide an aperture in the device or, more preferably, to provide a planar, substantially transparent window (i.e. lacking lenses) above the object.

One example of a multi-channel image generation device is a lenticular image generation device which, broadly speaking, comprises an array of one- or two-dimensional lenses (longitudinal/cylindrical lenses or 2D lenslets) behind which is located an image such that when the lenticular device is viewed from different angles different pictures are seen (because different parts of the underlying image are viewed. Broadly the image under the lenticular device comprises a set of interlaced stripes, the stripes belonging to different viewed pictures. Such a multiplexed lenticular imaging device could contain stereographic depth or animation within the perceived image.

The multi-channel image generation device may, as previously mentioned, comprise a multi-channel volume reflection hologram but this hologram may comprise a hologram of a lenticularly generated image. Alternatively the multi-channel image generation device may itself comprise a lenticular image generation device. In both cases, however, embodiments of the method avoid the need for multiple hologram recording exposures which could otherwise arise with such a device (and which cause considerable difficulties in practice). The skilled person will understand that even where the multi-channel image generation device comprises a lenticular, nonetheless the corresponding image replayed by the recording film comprises a holographic image.

The multi-channel imaging device could also comprise some other diffractive or refractive device such as a partially silvered mirror or a partially silvered transmission hologram where the silvering (often sputtered aluminium metal) has been selectively removed ("demetallisation") in the area of the three-dimensional object.

In embodiments of the method the hologram recording stack includes two or more multi-channel image generation devices. This facilitates a "mix and match" approach to fabricating a complex security hologram with considerable cost and time saving over an approach which fabricates separate masters for different desired replay image combinations in the recording film. Potentially the 3D object may be a virtual 3D object, itself generated by a hologram, but preferably a real, physical 3D object is used. For example a 'Denisyuk' master hologram, precisely 'colour-tuned' by chemical means to replay its image in the exact colour of the copying laser (or lasers), is in many ways almost equivalent to the original object in this context and has very similar qualities of realism and angle of view when its image is transferred into the final H3 hologram. In this case the hologram plate, unlike a solid object, despite its high reflectivity, is not opaque and steps are taken to block out any background image which would otherwise be seen through the space in which the object apparently resides. This may be by means of an opaque masking material attached behind the plate bearing the 3D image, or in front of the plate bearing the image layer which reconstructs the background to the object, or it may be by removal of the gelatin emulsion bearing any background image which would normally be obscured by a solid 3D object.

In preferred embodiments multi-channel volume reflection hologram comprises a multicolour, preferably full colour hologram. Preferably the holographic image recorded in the film also comprises a full colour (i.e. red, green and blue) hologram. This may be fabricated using a "multi-colour laser" (the inventors term this a "white" laser beam), that is a laser beam in which red, green and blue beams are combined on a single axis, for example using dichroic mirrors or beam splitters (although other techniques may be employed to generate such a "multi-colour laser"). Embodiments of the method we describe are especially useful for blue light since scattering from particulates in silver halide emulsion is enhanced at short wavelengths, and thus embodiments of the method we describe are particularly useful for fabricating full colour holograms. The skilled person will understand that for the holographic image to be a full colour holographic image not every part of the holographic image needs to be full colour; it is enough that the holographic image taken as a whole, that is including the hologram of the 3D object and the multi-channel holographic image, is full colour.

Embodiments of the method are particularly useful for mass producing a hologram in holographic recording film. In such a mass production technique the film may be transported over the multi-channel image generation device and 3D object by a step-and-repeat drive, recording a hologram at each step. Where the multi-channel image generation device comprises a hologram, preferably the emulsion of this hologram is away from the film (on the surface of a substrate of the H2 plate opposite a surface facing the film) to reduce the risk of scratching the emulsion of the H2 plate.

Preferably the emulsion of the film faces downwards (away from the illuminating beam) as this results in an image, when replayed, is the right way around (right-reading and orthoscopic, when the typical recording conditions for holography have been utilised.)

In some cases we have found advantageous effects in the creation of a pseudoscopic image reconstruction by inversion of the master hologram in conjunction with a first casting of a model which thus itself has inverted perspective. This condition can still be achieved by recording and replaying the H2 master with its emulsion reversed, i.e. retaining the glass surface on the upper side despite the fact that the image is reversed in perspective. When a "pseudoscopic" image is created by the mastering stack, then the recording film may be reversed so that the emulsion side is not adjacent to the master, so that a further reversal of the film layer before viewing will cause the image to revert again to its orthoscopic state.

The invention also provides a hologram recorded using a method as described above.

Thus in a further aspect the invention provides a hologram replaying a holographic image comprising a hologram of a three-dimensional (3D) object, wherein said three-dimensional (3D) object is a lenticularly generated 3D object, said hologram comprising a hologram of a lenticular multichannel image generation device behind which lies a set of interlaced stripes, the stripes belonging to different views of the object, wherein said different views of the object contain stereographic depth to generate said three-dimensional object.

The invention also provides apparatus for use in recording a holographic image, in particular as described above.

Thus in a still further aspect the invention provides apparatus for recording a security hologram in holographic recording film, said holographic image comprising a hologram of a three-dimensional (3D) object formed by a lenticular multi-channel holographic image, said apparatus including a stack comprising: said holographic recording film; a lenticular screen/array under said holographic recording film to generate a three-dimensional (3D) object; and an optical diffuser beneath said lenticular multichannel image generation device; and a reference laser beam arranged to illuminate said holographic recording film from above; and an object laser beam arranged to illuminate said optical diffuser beneath said lenticular multichannel image generation device; wherein an image under said lenticular screen/array comprises a multiplexed image containing stereographic depth or animation.

In embodiments the image under the lenticular screen/array comprises a set of interlaced stripes, the stripes belonging to different views of the object. The different views of the object contain stereographic depth to generate the three-dimensional object in the recorded hologram.

In embodiments the apparatus includes a spatial light modulator (SLM) or a digital micromirror device (DMD) beneath (in an optical path to) the lenticular screen/array in the stack. This modulates the object laser beam to generate the multiplexed image containing stereographic depth or animation. In embodiments with an array of cylindrical lenses the SLM or DMD generates a set of interlaced stripes, the stripes belonging to the different viewed pictures. The cylindrical lenses be aligned vertically to generate left-right stereograms in the recorded hologram, or horizontally to generate vertical parallax. Alternatively the lenticular screen/array may be an array of 2D lenslets to generate both horizontal and vertical parallax.

As previously mentioned, the hologram recording stack preferably includes an index matching fluid. Advantageously this indexing matching may be in the form of a UV-curable adhesive/lacquer. Accurate registration is important in a holographic production process and this approach "locks" the master stack together, making a permanent sealed master hologram and addressing the difficulty of transporting a holographic master of this type to a mass production facility. Whilst the previously describe "mix and match" flexibility is sacrificed for the particular, sealed assembly, the flexibility can be retained by retain other, for example glass, copies of individual layers/features for future assemblies. This is particularly beneficial in a stack in which there is a two layer master plate sandwich with security graphics in front of the lenticular/screen assembly (but no need for a bas relief component).

Thus the invention further provides a master stack for mass production of a security hologram, the master stack comprising: a lenticular screen; a hologram master; and index matching material between said lenticular screen and said hologram master, wherein the index matching material comprises an adhesive locking said lenticular screen and said hologram master together.

Preferably the hologram master bears a 2D security graphic in addition to a hologram recorded in an emulsion of the hologram master; this may be defined by selective removal of the emulsion. Preferably a diffusing screen is provided behind the lenticular screen. In some preferred implementations the lenticular screen comprises a holographic optical element, as previously mentioned.

BRIEF DESCRIPTION OF THE DRAWINGS

These and other aspects of the invention will now be further described, by way of example only, with reference to the accompanying figures in which:

FIGS. 2a to 2f show, respectively, plan and cross-sectional views of a flag hologram, protection of an active zone of the hologram by a mask, the hologram after removal of the mask in plan and cross-sectional views, a bath of gelatin etching solution, and an example volume hologram with a complex planar shape produced by selective removal of recording emulsion;

DETAILED DESCRIPTION OF PREFERRED EMBODIMENTS

We will describe techniques for incorporating a hologram of a three-dimensional (3D) object into a hologram in conjunction with a multi-channel holographic image so that on replay, depending upon the viewing conditions, the hologram of the 3D object and/or one or more channels of the multi-channel image are viewable. In this context a multi-channel image comprises an image in which one or more of image colour, image information content, and image parallax vary with the relative positions of the illumination, hologram and viewer. For example, typically, different viewing angles generate different images. In embodiments, the techniques we describe allow for the replacement of an 'H2' contact master hologram with a complex array of image forming components arranged in layers of depth so as to allow each to provide high diffraction efficiency image components in a mass produced hologram.

Figure 1:
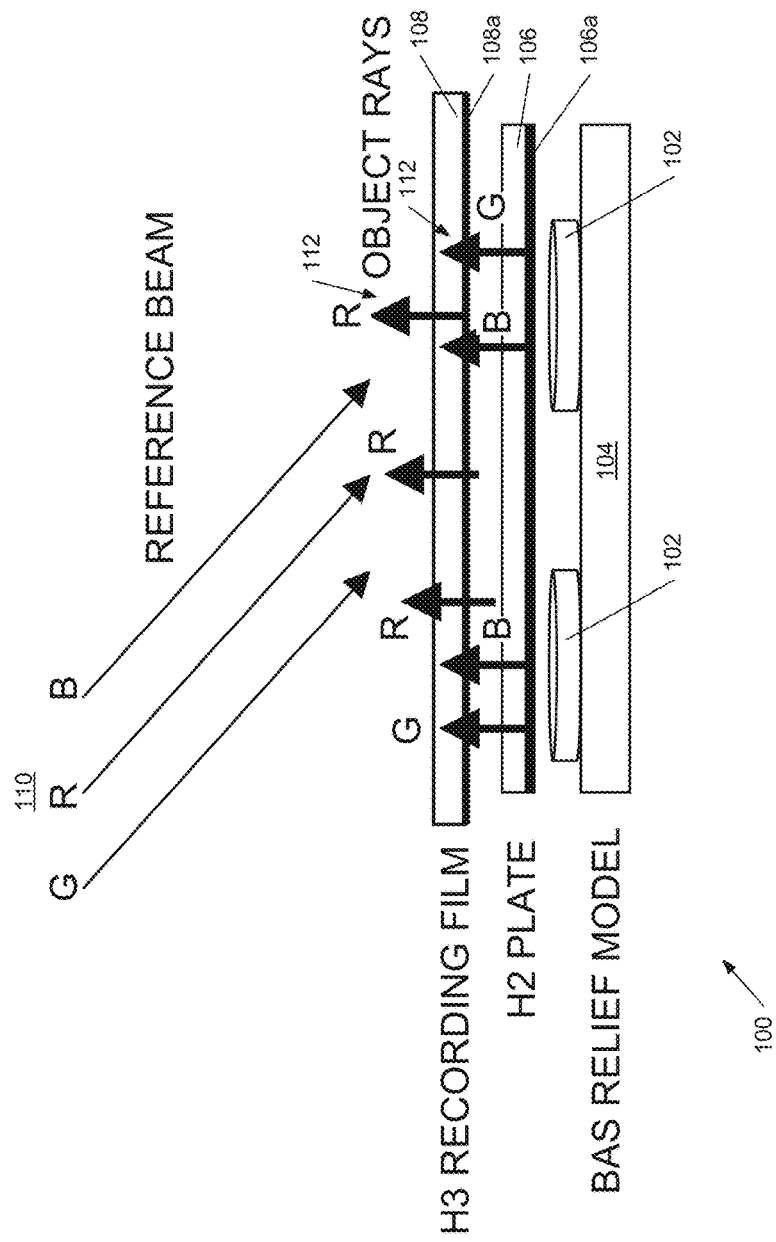
FIG. 1 shows a hologram recording system.

Referring to FIG. 1, this shows an embodiment of a hologram recording system 100. The system comprises one or more metal bas-relief models or objects 102 on a support 104. An H2 hologram such as an H2 contact master hologram 106 is located over the models or objects 102, preferably with the emulsion 106a downwards (where "upwards" is towards the reference beam). Third generation hologram (H3) recording film 108 is located above the H2 plate 106, again preferably with the emulsion 108a facing downwards. A "white" (i.e. red, green and blue) reference beam 110 impinges upon the stack 100 and generates reflected or returned beams 112 travelling generally upwards (the red light component passing readily through film 108, the green and particularly the blue components being attenuated, scattered or absorbed to some extent). A portion of the emulsion layer 106a of the H2 plate 106 may be removed in a region corresponding with objects 102, as illustrated more clearly in later figures.

A bas-relief model, that is an object with a surface relief pattern formed, for example, by carving or etching, is capable of producing a strong image when illuminated in a "Denisyuk" single beam mode. The model is preferably coated with a metallic surface layer which is also partially or substantially polarisation preserving. Control of the ratio of object and reference beam intensities can be used during manufacture of the H2 plate to provide bright colour component images, hence facilitating high image brightness in the H3 recording film 108.

Continuing to refer to FIG. 1, if objects 102 were, say, in front of the H2 plate 106 the planar surface supporting the H3 recording film would be disrupted creating difficulties in holding this film layer motionless for the (contact) copying process. This is particularly a problem for mass production. Locating the objects beneath the H2 plate and providing an aperture in the recording emulsion addresses this problem: It might be imagined that the stack, including the bas-relief model, could be covered with a supplementary anti-reflection coated glass plate, but this is unsatisfactory since it forces additional image depth to be recorded into the final hologram with unsatisfactory implications for image clarity in poor, for example fluorescent, lightning.

In operation, the H3 hologram is illuminated, with the recording film overlaid on the H2 plate, by a diverging or collimated white reference beam. The reconstructed holographic image, comprising rays of light reflected in the returning direction from the H2 then forms an object beam for the H3 recording. Interference with the incoming reference light then creates a fringe structure which gives rise to the H3 recording.

If a number of layers of image forming components for the individual image components are used, the component plates may be arranged as an array with a mechanical means of support such as a slide-in racking system (thus also facilitating image register). Index matching of the layer, or at least coupling of the individual layers, with suitable fluid, allows one to predominantly eliminate internal reflections from the glass surfaces and remove unsatisfactory Newton's rings from the recorded H3 image, and also to avoid wastage of laser light to ensure increased diffraction efficiency in the copy hologram. The image is a hybrid of the components of all of the layers.

In addition to the metallised, preferably bas-relief objects, in a system with multiple H2 plates (or other devices) one may record (or otherwise provide) one or more colour components in each of the plates and select the priorities for image components to have maximum brightness of visibility as regards their individual level of importance to the image. For example one may record a foreground in one plate and a background in another plate, or for another specific graphic design one may decide to record two colour components in the one plate where one component of each colour is associated with the foreground and one with the background plane. In some cases it is possible that two image components which reconstruct in the same plane or level of the final holographic image could be recorded in two separate layers at different levels of the stack, their different positions of depth within the stack being compensated by the degree of projection of their image from their respective H2 master plate.

In embodiments of a system for mass production of the H3 holograms the recording film should sit entirely stationary in the exposure gate during the period of the exposure, typically 1-5 seconds (although lower, potentially down to milliseconds for higher laser powers or where line scanning techniques are utilised), and a convenient way to achieve this is by a vacuum chuck system incorporated in the cover glass of the master stack, or to incorporate a pressure plate made of anti-reflection coated glass which effectively sandwiches the film in contact with the glass surface 106.

In some preferred embodiments the technique uses unique specialist precision cut metallised shapes as the model. For example, these may be in the shape of miniature keys. Thus for example metal, say in the form of platelets, may be etched or ablated on the surface with a serial number or alpha numeric code. In embodiments the etching is small enough not to be discernable by the unaided human eye but can be read using a magnifier. For example symbols of 50 micron size or less can be laser written into the surface of the metal. The alphanumeric code may be changed by, for example, producing a series of platelets or similar small metal objects. The number code etched into the metal may, for example, indicate different batches of hologram labels, and in embodiments this may cross reference to a database. In this way an inspector in the field can quickly analyse a hologram label; view its number and verify that the specific hologram batch is geographically correctly placed or is attached to the correct product using a link to the database.

In embodiments the technique uses any of a range of modern high-resolution photopolymer materials in this part of the process to fabricate a metal (e.g. Aluminium)-coated resin bas-relief model or object. Some of these photopolymer materials are sold as particularly suitable for high relief models and use of these is preferable as this facilitates the use of purpose-made bas-relief models. For example the surface relief may be up to 0.5 mm or 1 mm deep (possibly even deeper); an optimum thickness may, for example, be determined by experiment. Alternatively a dielectric coating, in particular a multilayer dielectric coating, rather than a metal coating may be employed, for example to facilitate the provision of colour effects. In embodiments microscopic surface detail is created and cast into a suitable moulding material, metallised and incorporated, say, into an array of such devices or models. Such microscopic detail may include microscopic text of for example less than 0.3 mm height. Colouration of these models is also possible.

The type of hybrid image produced by the H3 hologram has the unusual and valuable property that whereas the component of the image associated with the H2 master may have a limited viewing angle resulting from the limited dimensions of the H1 hologram, the metallic model will tend to produce an image viewable from a very wide viewing angle, limited only by the critical angle in accordance with Snell's Law.

Furthermore, the three dimensional image from an H2 placed behind the model will appear to form itself around the body of the model component which will form its own appropriate (and desirable) three-dimensional shadow. However, an H2 hologram forming the front layer of the stack may require a "block-out" mask in its origination route, or equivalent emulsion removal as described elsewhere. Conversely, certain subject matter may produce aesthetically pleasing effects when no blocking is provided and the mixing of colours associated with the various image components can be particularly attractive to the eye.

Preparation of a series of planar image components of the type described whether they might be hologram contact masters, shallow relief models, simple optical components, or even complex optical devices such as lenticular displays, or complex electronically addressable spatial light modulators capable of personalisation or enumeration of the individual mass produced hologram, leads to the possibility of a unique "mix and match" image. In other words in embodiments the total graphic image is the product of a series of component images which in themselves may not be unique images, but which in combination provide the customer with a unique image of high security value at low production cost, since certain identical components may be used for a separate customer.

The individual customer can thus be furnished with a unique hologram image compounded from a series of off-the-shelf stock component images. This provides a new concept for the supply of customised holograms to an individual customer, who may thus receive his or her own specialised image created from numerous components, with the option that perhaps just one of these need be purpose-made and may perhaps contain a corporate logo or symbol. In embodiments the result is that the cost of mastering and preparation for a unique production hologram is radically reduced. This reduction of cost associated with the manufacture of a reflection hologram can then be used to offset the potentially increased cost of volume reflection holography recording materials as compared to embossed holography, whose basic foil cost is considerably lower than the live photosensitive material used for reflection hologram mass production.

In embodiments of the technique a stack of H2 hologram plates can be incorporated into the array. A practical difficulty which could arise is that the effect of blue laser light on the silver halide emulsion used to record most of the masters tends to cause scatter. However embodiments of the technique we describe solve this problem.

In embodiments we use a technique, described below, to remove the recording emulsion from the glass plates in an image-wise shape so as to leave only that emulsion which is active as an image source. Otherwise the silver halide crystals (which in the modern superior emulsions are minuscule in comparison with their historic counterparts in the Agfa/Kodak era of the 1970's and 1980's, as they now have grain size of around 15 nm diameter as compared to grains in excess of 35 nm in that era) could cause a lack of clarity of the layer by virtue of their tendency to scatter blue light, thus reducing the maximum brightness and raising the level of scatter or haze in the holographic image, For example, if the image is in the style of the 2D/3D format, it is possible to remove the area of emulsion surrounding the foreground graphics so as to leave an active island of emulsion. The clean glass thus exposed on the remainder of the surface does not substantially scatter the laser light during recording.

Consider a simple case in which, for example, we have a two-dimensional foreground image such as a flag design where the 2D graphic lies in the surface of the emulsion or just slightly displaced in the adjoining space. Referring to FIGS. 2a and 2b, these show plan and cross-sectional views of such a flag hologram 200. The recording emulsion 202 surrounding the image planed graphic 204 is thus entirely redundant, whilst remaining a source of scatter and attenuation.

The inventors have found that a solution to this problem is to remove the gelatin emulsion selectively for the redundant areas. The active zone may be protected, for example, with an adhesive mask 206 (for example, PVC adhesive tape), as shown in FIG. 2c. After applying the protective masking to the gelatin layer, the plate can be at least partially submerged in a gelatin solvent such as sodium hypochlorite solution. As soon as the exposed silver halide/gelatin layer had dissolved, the plate is removed from the solvent bath and carefully washed in running water before drying. The resulting plate after removal of the mask, without the scattering surround, is shown in plan and cross-sectional views in FIG. 2d. This plate has an active zone of emulsion 204 with diffractive fringe structure as an island on a clean glass plate.

Following this procedure the hologram may, for example, be laminated with index matching to another plate containing other image colour components or planes, without deletion of the brightness, quality or scattering qualities of the stack.

This technique allows one to form a stack of two or more glass plates without deterioration of the cosmetic image quality whilst allowing the advantage of reducing the data storage capacity of individual emulsion layers by effectively overcrowding the diffractive structures.

An alternative technique enables selective removal of the gelatin in an image related shape including intricate detail for a case where the planar image component is not in the form of a simple shape such a flag graphic previously described. Here a gelatin etching bleaching process is used. A photo-mask is contact copied onto the plate to allow a heavy exposure to the zones to be removed from the gelatin emulsion in a bath of gelatine etching solution as shown in FIG. 2e.

This plate is then developed to high density, for example in excess of 2.0 OD (optical density), using say an ordinary developing process (e.g. using a ~pH 11 ascorbic acid and Metol™ solution). The plate is then bleached with a solution (the gelatine etchant) containing an acidic solution of cupric chloride, more particularly a copper II oxidant, urea and hydrogen peroxide in, say, acetic acid (~pH 3). These compounds enable the silver attacked by the copper to catalyse local, selective attack on the gelatin layer. The effect is to denature the gelatin associated with the black silver metal and to allow this to be released into solution and leave a clean scatter-free glass surface when the plate is carefully dried. The holographic fringes are included in the volume of the complex shape as shown in FIG. 2f and can produce an H3 with detailed parallax interaction with one or more rear planes in the form of holographic transfers or Denisyuk recordings of bas-relief models as detailed above. Thus this technique can be used to lithographically impose a (complex) 2D pattern or shape onto a volume hologram.

In some embodiments a lenticular element may be incorporated into the system 100 additionally or alternatively to H2 hologram 206.

One method to achieve this is to produce a lenticular image on a clear substrate such as a transparency film. The image can be 3D, animated or both. The 'interlaced' transparency is laminated to a lenticular lens array. When viewed, the lenticular lens presents different views of a scene to each eye. The brain perceives this as a 3D scene or as an animated image. If the laminated lens is back illuminated with a laser, the scene can be recorded onto a holographic plate. In embodiments, in effect the holographic artwork is replaced with the lenticular element (image). This may be achieved without stereogram techniques which employ multiple exposures onto the holographic plate. Instead a 3D or animated effect may be added in a single exposure.

Thus in embodiments the system provides a lenticular 3D image as a hologram backdrop. By creating a 3D lenticular image on a transparent film base in colour and laminating this to a lenticular screen, it is possible to generate a true colour three dimensional backdrop in a hologram. In addition, it is possible to generate animations using lenticular backgrounds in colour. These lenticular devices may in some cases be additionally lit from the reverse side with a coherent laser beam to enhance brightness. This allows a holographer to produce a stereogram effect in a single exposure rather than multiple exposures. The lenticular screen may be oriented horizontally for up and down animation or vertically for left right or three dimensional effects.

Exposing the lenticular through red, green and blue lasers in sequence, the colour transparency acts as a colour separator and the reconstructed image will also reproduce mixtures of these colours. Such lenticular technology has value as a security feature. Further, 3D holograms are limited in the depth that they can display with clarity and sharpness. Substituting a 'deep' hologram background with a lenticular version can enhance the perception or illusion of depth even though it is actually only on a single plane. The lenticular image can be created by computer, photographic means or from a graphic design.

One of the criticisms made of lenticular imagery is that the lens has a thickness which can make the structure unsuitable for label products as it stands proud of the product onto which is attached. Embodiments of the technique we describe allow lenticular imagery to be recorded holographically and this can then be applied as a thin security label. Further lenticular-based techniques are described later.

Figure 3:
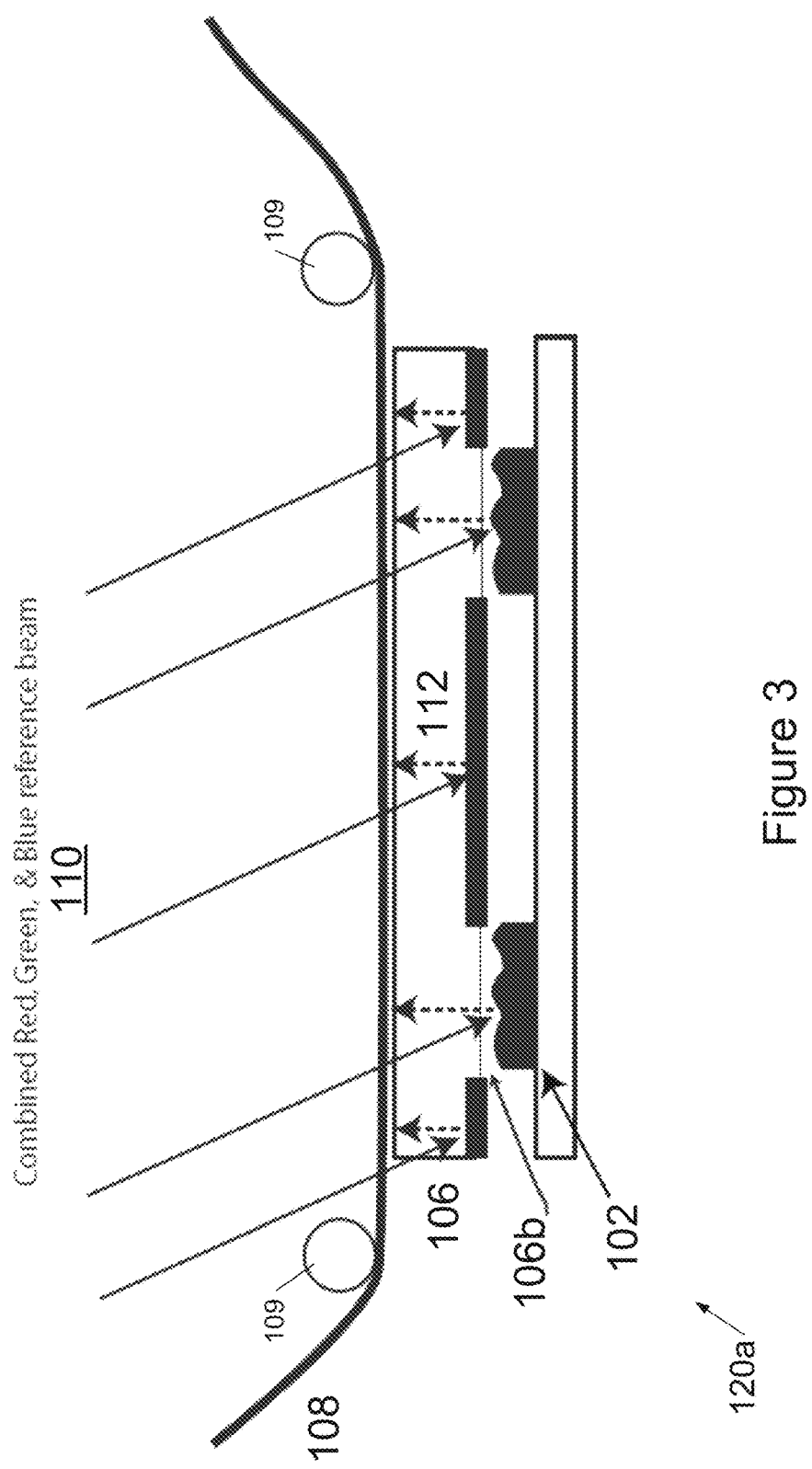
FIG. 3 shows a vertical cross-section through an example of holographic film recording apparatus illustrating a layout of interchangeable image elements.
Figure 4:
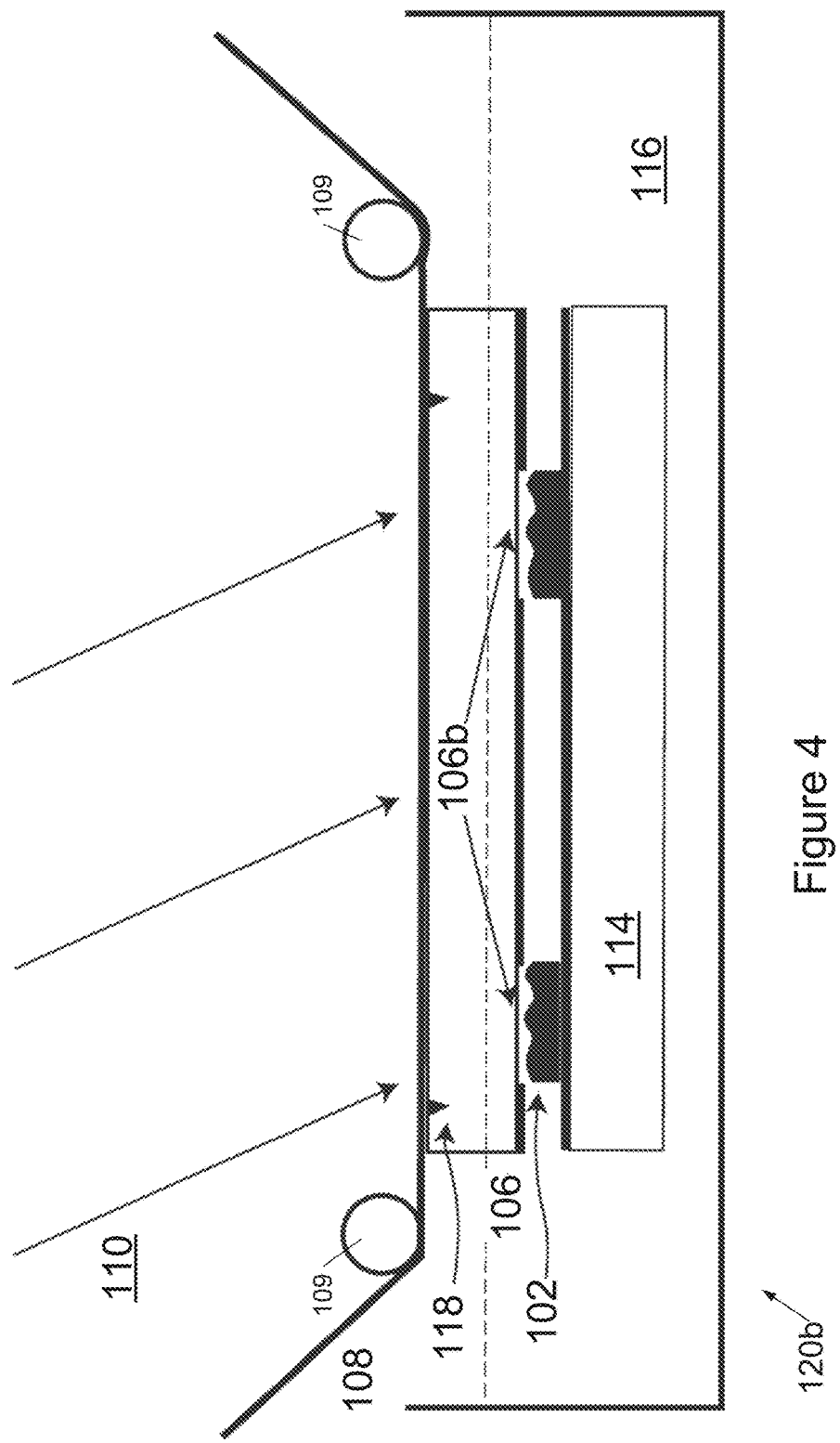
FIG. 4 shows a second example of holographic film recording apparatus according to an aspect of the invention in which image elements are in an index matching tray.

Referring now to FIG. 3, this shows a first example 120a of holographic film recording apparatus, in which like elements to those of FIG. 1 are indicated by like reference numerals. The apparatus of FIG. 3 shows the transparent apertures 106b in the hologram plate 106 (or other multi-channel optical element). As indicated in FIG. 3 the apparatus includes a film transport mechanism 109. Referring now to FIG. 4, this shows a second example 120b of recording apparatus, similar to the apparatus of FIG. 3, in which like elements are indicated by like reference numerals.

The apparatus of FIG. 4 includes a vacuum channel 118 for holding film 108 flat during a hologram-recording exposure. In the case of photopolymer film (such Bayfol, from Bayer Materials Science, Leverkusen, Germany, the inherently "sticky" nature of the film may assist in holding the film still without assistance from other devices.

Figure 5:
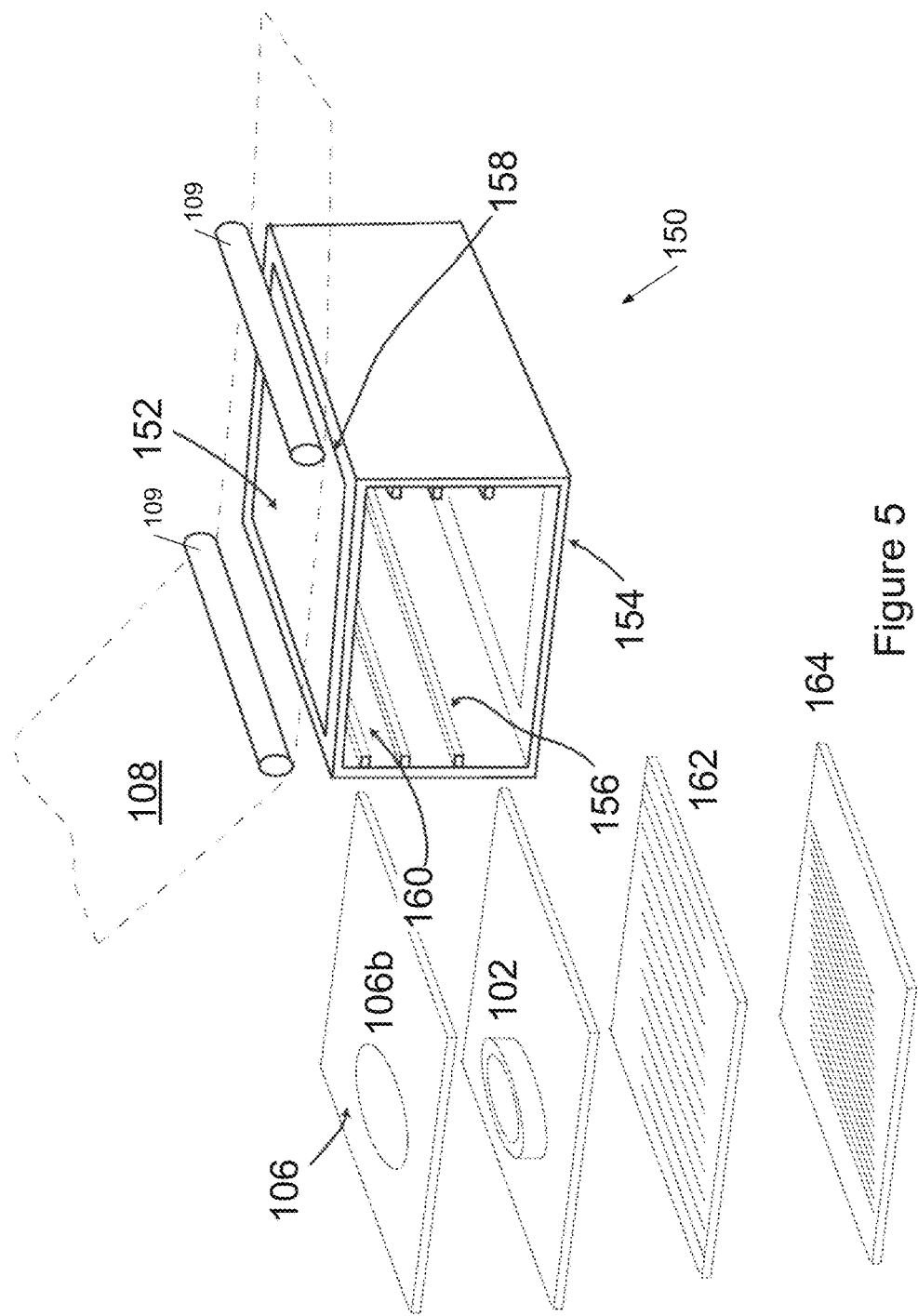
FIG. 5 shows a perspective view of a modular master hologram stack.

The system of FIG. 4 also includes a second multi-channel optical element 114 below bas-relief elements 102. Again this may comprise a volume reflection hologram or a lenticular image forming device. Preferably in such an arrangement the system is at least partly immersed in a tank or reservoir of index matching or coupling liquid 116. As previously described, multi-channel optical element 106 may likewise comprise either a volume reflection hologram or a lenticular device. Referring now to FIG. 5, this shows a perspective view of a modular interchangeable image element stack unit 150, again with like elements to those previously described indicated by like reference numerals.

The unit 150 has an aperture 152 in an upper surface and a film holding system 158 such as a vacuum channel to hold the film 108 flat. The unit includes a plurality of support runners 156, 160, preferably one or more of these being vertically adjustable. In this way optical elements such as H2 plate 106 may be slid onto the runners within the unit. The optical elements may include none, one or more of: a volume reflection hologram, a lenticular image forming device 162, a digital light modulator, for example a liquid crystal spatial light modulator 164, and optionally other single- or multi-channel or animated optical elements including an embossed hologram. Preferably the unit incorporates a transparent base 154 to facilitate back lighting, for example with an coherent object beam split from the copying reference laser beam, so as to allow the rear lighting of a lenticular or LCD spatial modulator. As illustrated the unit is open on one face but in preferred embodiments a sealable cover is provided including a fluid port to allow the unit to be filled with index matching or coupling fluid as previously described.

Figure 6:
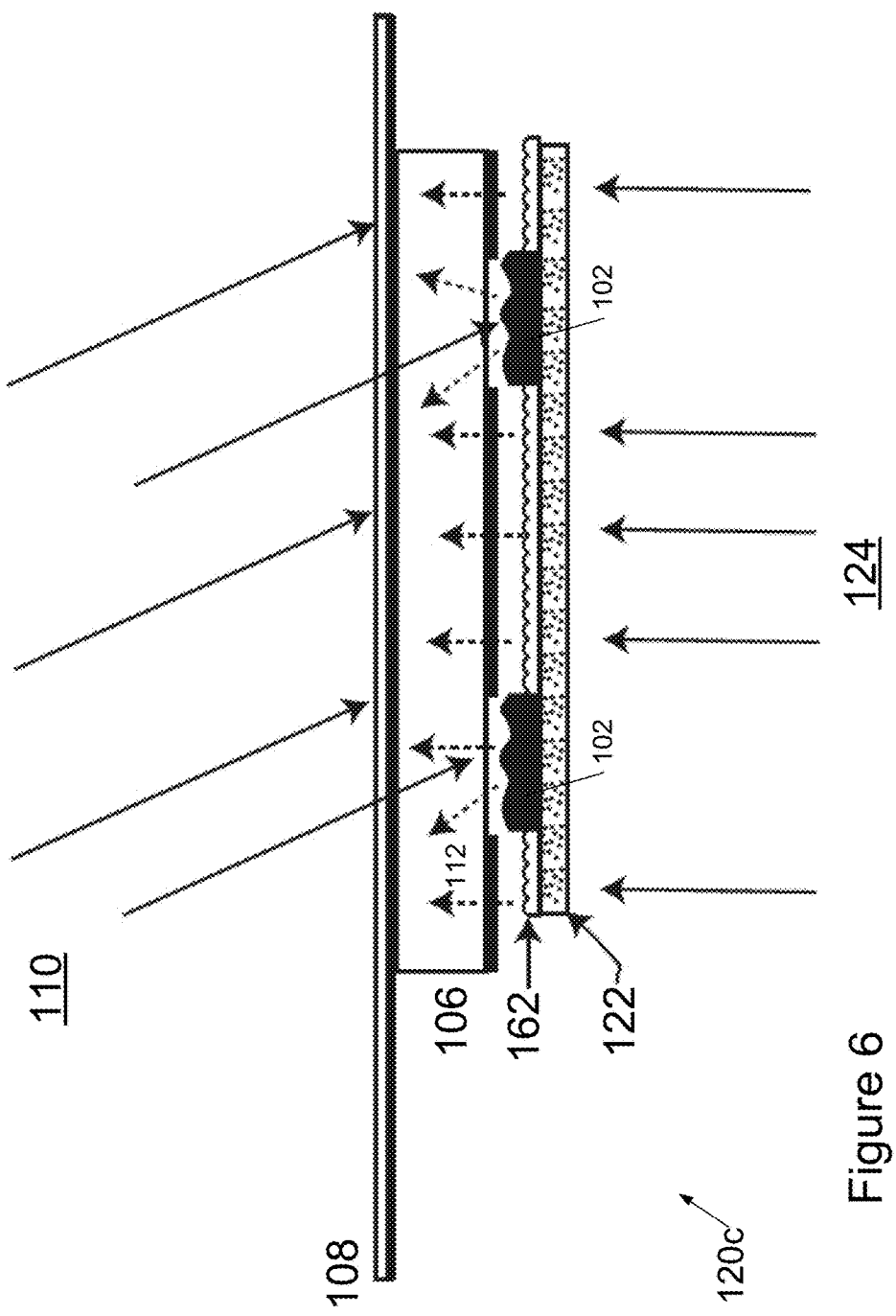
FIG. 6 shows a further example of hologram recording apparatus, the apparatus including a multi-channel lenticular element.

FIG. 6 shows a further example 120c of hologram recording apparatus, this example including a lenticular screen 162 either below the object 102 or, as shown, in substantially the same plane as the objects, the objects being set into the screen 162. As illustrated an optical diffuser 122 is also provided and the system, in operation, may thus be illuminated by an object beam 124. Again, preferably the object beam comprises red, green and blue laser beams and in embodiments this is split from the reference beam so that the object and reference are coherent.

Figure 7:
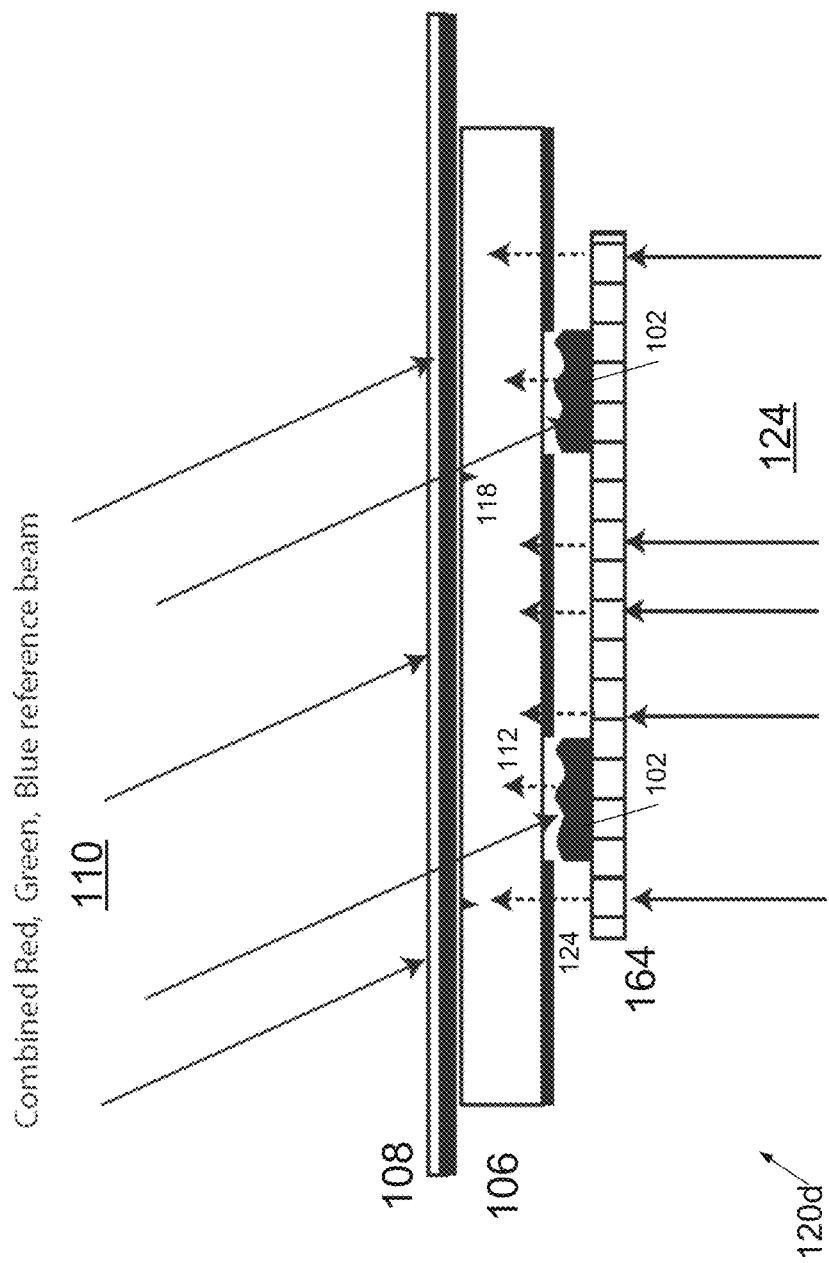
FIG. 7 shows a further example of hologram recording apparatus, the apparatus including a spatial light modulator and a bas-relief model.

FIG. 7 shows a further example 120*d* of apparatus along the lines previously described again with like elements indicated by like reference numerals. The apparatus of FIG. 7 includes a spatial light modulator 164 such as an LCD (liquid crystal display) screen, light rays 124 transmitted through this impinging on film 108 to enable an image displayed on the LCD screen to be incorporated within the film volume hologram.

Thus embodiments of the systems we have described are able to produce a mass produced 'H3' type hologram using a hologram and optionally other image-forming components to provide an image which has the advantages of both an exceptionally wide angle of view and high brightness as well as image switching. In embodiments other useful image qualities may also be provided such as full and stable colour, individual enumeration, or other image personalisation and image depth including real images projecting from the surface of the final film carrier.

Instant Full Colour Refection Hologram Portrait.

For the implementation of real time reflection hologram formation, an optical method is desired which is simple, fast and robust, to the point of being capable of incorporation in machinery intended for location in a printing house environment rather than a classical holography laboratory. Such a technique is now described.

We employ for this method a means by which data comprising three dimensional ("stereographic") information capable of representing a human portrait suitable for identification (ID) applications can be incorporated into a full-colour (tri-stimulus) reflection hologram, preferably in real time as regards the preparation of security documents containing a holographic security device.

In order to avoid the production of a first generation master, which is one means to integrate a number of individual angular views of the subject into a recording capable of the simultaneous display of said data as a three dimensional image, we have devised methods to display a three dimensional image in real time in such a form that it can be captured in a single ("live") holographic recording step.

To achieve this, we utilise a lenticular optical device of the type which provides a "pseudo" 3D image by the presence of a linear lens array or a 2D "micro-lens" array, for example of the type used to provide a spatially variable view of multichannel data printed upon a high resolution backdrop. An example of such technology used in a security application is in the British plastic card driving license, wherein a lenticular relief structure is used to provide alternative views of an alphanumeric ID code and an expiry date dependent upon the viewer's position relative to the document. However, the relief lens structure inconveniently requires a considerable thickness of the component layer which is not necessary with the equivalent holographic method now described.

In our approach, the lenticular array is used as an intermediate optical device to display a three dimensional image which is recorded directly into a holographic medium.

In this technique, a holographic image is recorded in the film which is three-dimensional by virtue of the ability of the lenticular system to display a simultaneous view of the stereographic component data—thus eliminating the need to create a master H1 hologram. The SLM system is used to project the image data in the form of a linear array or 2D micro-lens array in real time onto a diffusion screen attached to the reverse side of the lenticular screen. The laser beam(s) used to project this image are coherent with the recording beam incident upon the holographic recording film, which could be silver halide or photopolymer based.

Figure 8:
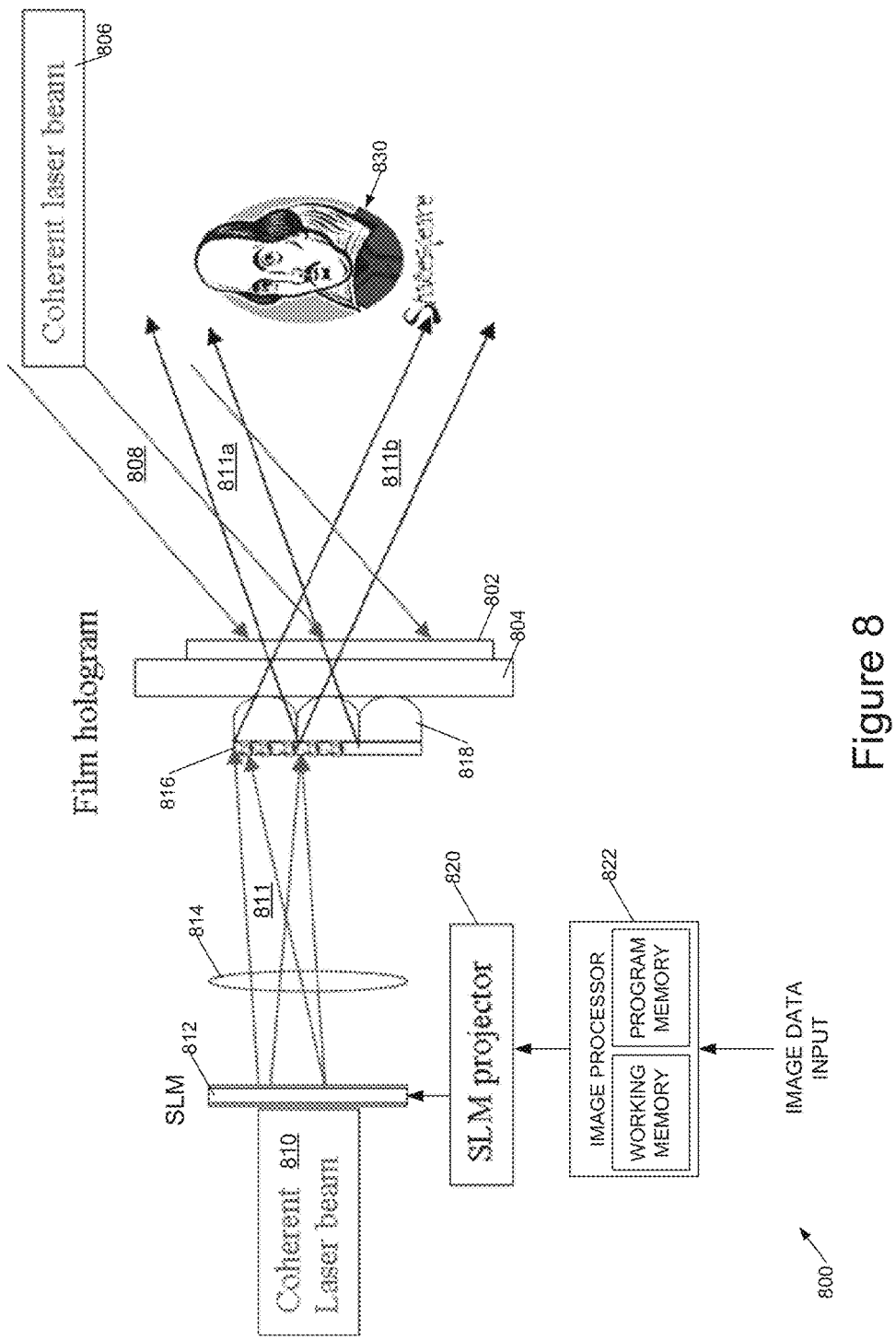
FIG. 8 shows hologram recording apparatus employing a lenticular system to display simultaneous views of the stereographic components of 3D data such that a 3D holographic image is recorded in the film.

Thus referring next to FIG. 8, this illustrates an embodiment of apparatus 800 for recording a hologram encoding a 3D view of an object.

The apparatus comprises a glass plate 802 supporting holographic recording emulsion 804 adjacent or in the vicinity of a lenticular array 818 (1D or 2D lenslets), shown in cross-section in the figure. A diffusing screen 816 is located behind the lenslet array 818.

A laser 810 generates an object beam 811 which impinges on the rear of the diffusing screen 816. A second laser 806 generates a reference beam 808 which impinges on the holographic emulsion 804 through glass supporting plate 802.

The object beam 810 is modulated by a spatial modulator 812, as illustrated a transmission device but in other embodiments a reflection device such as a DMD, and projection optics, in the illustration lens 814, project a corresponding image onto diffuser 816.

SLM 812 is driven by an SLM projector 820 which, in embodiments, receives image data from an image processor 822 comprising working memory, program memory storing image processing code, and a processor (not shown).

In embodiments the image processor 822 may receive input image data comprising a set of 3D views of an object (real or virtual) and may generate an interlaced set of images from these different views. This may comprise, for example, an interlaced set of image stripes or regions, successive stripes or regions corresponding to successive views, the stripes or regions spaced so that a spatial repetition frequency of stripes/regions of any particular image matches a pitch of the lenslet array when the image is projected on screen 816. It will be appreciated that the image processor may interlace in either 1D or 2D, depending upon whether the lenslet array is a 1D or 2D array.

Optionally image processor 822 may generate the set of views of one or more objects from non-3D data. Thus, for example, a 2D image such as a 2D portrait may automatically be converted to a 3D image by image processor 822 for generation of a set of different 3D views of the object. Additionally or alternatively the object may be animated by image processor 822 or modified in other ways.

The skilled person will appreciate that the interlaced images will eventually, in the final hologram, be angularly encoded and thus retrievable by a human or machine viewer by selecting a viewing angle for the hologram. Image processor 822 may therefore combine images in any desired manner in order to encode images into the hologram for any desired angular replay. Thus although some preferred embodiments replay 3D objects, other applications of the invention may encode additional data—for example at a particular angle an identification code may be incorporated into the hologram by, for example, including the identification code in one of the interlaced images.

In the illustrated example the interlaced images encode views of Shakespeare's head from different viewing angles. In this example these images are interlaced and projected onto screen 816. The lenticular array 818 then re-encodes these interlaced images as a set of different angles 811*a-b* of the object beam, and these different angles are written into the hologram by interference with reference beam 808. In this way when the hologram is developed, viewing the hologram at different angles will replay the different, recorded angles from which the original images were derived, preferably the angles of the different views of the object matching those encoded by the lenticular array and written into the hologram. Thus in this manner a 3D view of, in this example, Shakespeare's head 830, may be encoded into the hologram so that the hologram reconstructs an image which gives the appearance of the true 3D object.

No doubt many other effective alternatives will occur to the skilled person and it will be understood that the invention is not limited to the described embodiments but encompasses modifications apparent to those skilled in the art lying within the spirit and scope of the claims appended hereto.

We claim:

1. A method of recording a holographic image onto holographic recording film, said holographic image comprising a hologram of a three-dimensional (3D) object from a lenticular multi-channel image generation device, the method comprising:
    forming a holographic recording stack by:
        positioning said holographic recording film over said lenticular multichannel image generation device;
        locating an optical diffuser beneath said lenticular multichannel image generation device;
        generating, electronically, an interlaced image comprising a set of different views of the 3D object from different angles;
        projecting the generated image into the diffuser;
        combining the different views of the 3D object using said lenticular multichannel image generation device by mapping from the set of different views of the 3D object from different angles into an angularly encoded object beam using the lenticular multichannel image generation device so that the views can be replayed distinct from one another; and
        recording said holographic image in said holographic recording film by forming a volume hologram by illuminating said stack through said holographic recording film with a laser light of at least one wavelength to record all the different angles simultaneously into the volume hologram,
    wherein said volume hologram comprises a volume reflection hologram of said lenticular multi-channel image generated by said lenticular multichannel image generation device such that a moving 3D view of the object is obtained when the hologram is replayed.

2. A method as claimed in claim 1 further comprising, after locating said optical diffuser beneath said lenticular multichannel image generation device, illuminating said optical diffuser with a coherent object beam.

3. A method as claimed in claim 2 further comprising positioning a spatial light modulator or digital micromirror device beneath said lenticular multichannel image generation device and illuminating said optical diffuser with said spatial light modulator or digital micromirror device to generate said three-dimensional object.

4. A method as claimed in claim 3 further comprising generating a spatially multiplexed image containing stereographic depth or animation for said spatial light modulator or digital micromirror device to encode into said coherent object beam, and converting said coherent object beam encoding said spatially multiplexed image to multiple different angles of said coherent object beam bearing different views of said multiplexed image using said lenticular multichannel image generation device.

5. A method as claimed in claim 1 further comprising locating said holographic recording film adjacent said lenticular multi-channel image generation device in said stack.

6. A method as claimed in claim 5 wherein said hologram recording film is supported on a substrate with an emulsion side of said film facing said lenticular multi-channel image generation device.

7. A method as claimed in claim 1 wherein an image under said lenticular multi channel image generation device comprises a set of interlaced stripes, such that light at different angles from said lenticular multi-channel image generation device provides different parts of the image, the stripes belonging to different views of the object, wherein said different views of the object contain stereographic depth to generate said three-dimensional object.

8. A method as claimed in claim 1 wherein said laser light comprises red, green and blue laser light, and wherein said holographic image comprises a full colour holographic image.

9. A method of mass-producing a hologram in holographic recording film using the method of claim 3.

10. A method as claimed in claim 9 further comprising repeatedly stepping said film over said lenticular multichannel image generation device forming said at least one 3D object and recording a hologram in said film at each step.

11. Apparatus for recording a security hologram in holographic recording film, said holographic image comprising a hologram of a three-dimensional (3D) object formed by a lenticular multi-channel holographic image, said apparatus including a stack comprising:
    said holographic recording film;
    a lenticular screen under said holographic recording film to generate a three-dimensional (3D) object; and
    an optical diffuser beneath a lenticular multichannel image generation device comprising the lenticular screen; and a reference laser beam arranged to illuminate said holographic recording film from above; and
    an object laser beam arranged to illuminate said optical diffuser beneath said lenticular multichannel image generation device;
    wherein an image under said lenticular screen comprises a multiplexed image containing stereographic depth or animation, and
    wherein said hologram comprises a volume reflection hologram of said lenticular multichannel holographic image.

12. Apparatus as claimed in claim 11 wherein said image under said lenticular screen comprises a set of interlaced stripes, the stripes belonging to different views of the object, wherein said different views of the object contain stereographic depth to generate said three-dimensional object.

13. Apparatus as claimed in claim 11 further comprising a spatial light modulator or digital micromirror device in an optical path to said lenticular screen to modulate said object laser beam to generate said multiplexed image containing stereographic depth or animation.

14. A hologram recorded in holographic recording film using the method of claim 1, said hologram replaying a holographic image comprising a hologram of a three-dimensional (3D) object, wherein said three-dimensional (3D) object is a lenticularly generated 3D object, said hologram comprising a hologram of a lenticular multi-channel image generation device behind which lies a set of interlaced stripes, the stripes belonging to different views of the object, wherein said different views of the object contain stereographic depth to generate said three-dimensional object.

* * * * *